United States Patent Office 3,126,382
Patented Mar. 24, 1964

3,126,382
VAT DYESTUFFS CONTAINING HALOPYRIMI-
DINE SUBSTITUENTS
Max Staeuble, Basel, Switzerland, assignor to Ciba
Corporation, a corporation of Delaware
No Drawing. Filed Nov. 16, 1960, Ser. No. 69,553
Claims priority, application Switzerland Nov. 20, 1959
7 Claims. (Cl. 260—256.4)

This invention provides valuable new vat dyestuffs which correspond to the general formula (1) 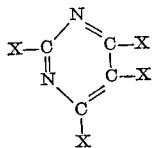

in which at least one X represents the radical of a vat dyestuff (as defined below) or of an intermediate product which is converted into such a dyestuff when it is bound through an —NH-bridge to the carbon atom of the pyridine ring, at least one, advantageously at least two, of the other X's each represent a halogen atom, and any remaining X's each represent a hydrogen atom, a halogen atom or an alkoxy, alkyl or aryl radical or a nitro group.

Especially advantageous are dyestuffs of the general formula (2) 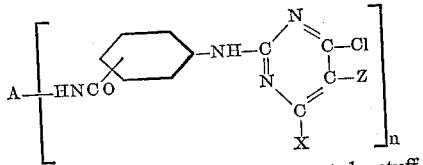

in which A represents the radical of a vat dyestuff (as defined below), or of an intermediate product convertible into such dyestuff, X represents a chlorine atom or an alkyl group, Z represents a hydrogen or chlorine atom, and n is the whole number 1, 2 or 3.

The term "vat dyestuffs" is used herein to denote those vat dyestuffs which can be converted by reduction into a leuco-form or vat, possess a better affinity for natural or regenerated cellulose fibers than in the non-reduced form, and can be reconverted by oxidation into the original chromophoric system.

As suitable vat dyestuffs there may be mentioned more especially those of the anthraquinone series, for example, those which contain an unchanged 9:10-dioxo-anthracene ring, and also anthraquinones which contain fused-on carbocyclic or heterocyclic rings or consist of a plurality of anthraquinone units, and also vat dyestuffs of the perylene tetracarboxylic acid and naphthalene tetracarboxylic acid series, and indigoid vat dyestuffs. These dyestuffs may contain substituents of the kind usual in vat dyestuffs, for example, halogen atoms, alkoxy groups, acylamino groups or arylamino groups. In certain cases the presence of hydrophilic groups, for example, carboxylic acid groups or more especially sulfonic acid groups or sulfate groups, may be of advantage.

The invention also provides a process for the manufacture of vat dyestuffs of the above Formula 1, wherein a vat dyestuff containing at least one acylatable amino group, or an intermediate product which contains at least one acylatable amino group and is converted into a vat dyestuff by the acylation of such amino group, is condensed with a pyrimidine derivative of the formula (3) 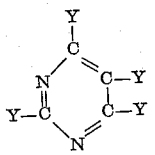

in which at least two of the symbols Y represent halogen atoms, and the other remaining Y's each represent a hydrogen atom, a halogen atom or a nitro, lower alkyl, alkoxy or arylamino group, particularly a radical of the formula (4) 

in which m is 1 or 2, the condensation being carried out in such manner that the resulting product contains at least one, and advantageously two, halogen atoms in the pyrimidine radical.

As examples of pyrimidine derivatives there may be mentioned:

2:4:6-trichlorpyrimidine,
2:4:5:6-tetrachlorpyrimidine,
2:4-dichloro-6-methylpyrimidine,
2:4-dichloro-5-nitropyrimidine,
2:4-dichloro-5-nitro-6-methylpyrimidine,
2:4:6-trichloro-5-nitropyrimidine, and also the acid chlorides of the condensation products of one molecular proportion of one of the aforesaid halogen-pyrimidine derivatives with one molecular proportion of 3- or 4-amino-benzoic acid or 5-amino-isophthalic acid, for example, the chlorides of the following carboxylic acids:

2-(3'- or 4'-carboxyphenylamino)-4:6-dichloropyrimidine,
2-(3'- or 4'-carboxyphenylamino)-4:5:6-trichloro-
   pyrimidine

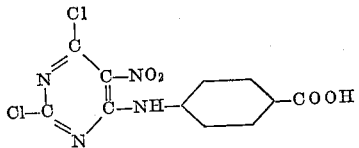

or

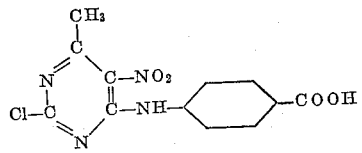

The vat dyestuffs or intermediate products used as starting materials in the process may contain one or two amino groups. There may be mentioned, for example, 1-amino-anthraquinone and simple substitution products thereof, for example, 1-amino-4-methoxy anthraquinone, or 1-amino-4- or -5- or 8-acylamino anthraquinones, and especially 1-amino-4- or -5- or -8-benzoyl amino anthraquinones. The latter may be substituted in the benzoyl radical, for example, by a halogen atom or a methoxy, alkyl, trifluoromethyl, sulfonamide or sulfone group. There may also be mentioned 1:4-diamino anthraquinone and 2-substitution products thereof, 1:5- or 1:8-diamino anthraquinone and 1:5-diamino-4:8-dihydroxy anthraquinone.

The radical A in the above Formula 2 also includes anthraquinone radicals which contain fused-on carbocyclic or heterocyclic rings, 4-amino anthraquinone-2:1(N)-acridone, 5-amino-1:9-isothiazole-anthrone, 4- or 5-aminoanthrapyrimidine, amino-acedianthrones, 4- or 5-amino-1':1-dianthrimide-carbazole, 4- or 5-amino-5'-benzoylamino-dianthrimide-carbazole, 4 - amino-4'-benzoylamino-dianthrimide-carbazole or 4:4'- or 5:5'-diamino-1:1'-dianthrimide-carbazole, 4-aminoanthrapyridones, aminodibenzanthrone, aminoisodibenzanthrone, aminoanthranthrone, aminobenzanthrone, aminoflavanthrone and the compound of the general formula

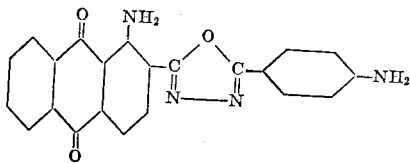

There are advantageously used compounds which contain 3 to 5 fused-on rings.

The reaction of the aforesaid amino-compounds with the pyrimidine derivatives of the Formula 3 is advantageously carried out in an inert organic solvent, for example, nitrobenzene, chlorobenzene or ortho-dichlorobenzene at a raised temperature. The molecular proportions of the components are advantageously so chosen that one molecular proportion of the compound of the Formula 3 is used for each amino group present in the vat dyestuff or intermediate product used as starting material.

The dyestuffs so obtained can be isolated from the reaction medium and worked up into useful dry dyestuff preparations, notwithstanding the presence of exchangeable halogen atoms. The dyestuffs are advantageously isolated by filtration. The filtered dyestuffs may be dried, if desired, after the addition of an extender having a neutral or weakly alkaline reaction. Advantageously the drying is carried out at not too high a temperature and, if desired, under reduced pressure. The dyestuffs of this invention are suitable for dyeing a very wide variety of materials and especially for dyeing or printing textile materials of natural or regenerated cellulose by the usual dyeing or printing methods used for vat dyestuffs.

As the reactivity of the halogen atom or atoms in the pyrimidine ring may vary from dyestuff to dyestuff it is of advantage to select the dyeing conditions accordingly, especially the concentration of the alkali and of the reducing agent, and the duration and temperature of the dyeing or steaming of the dyestuff. The most favourable conditions can easily be determined by preliminary tests.

The dyeings and prints produced with dyestuffs of this invention are distinguished by their excellent fastness to light and properties of wet fastness.

In view of the fact that the dyestuffs, in contradistinction to the conventional vat dyestuffs are generally substantially irremovable from the fiber by means of hot dimethyl-formamide, it must be supposed that the dyestuff is chemically bound to the fiber.

The dyeings produced with the dyestuffs of this invention are, therefore, fast to dry cleaning and fast to migration. Fabrics dyed with these dyestuffs can therefore be coated with synthetic resins, for example, polyvinyl chloride, without the dyestuff migrating into the synthetic resin, which is especially important for the production of artificial leather.

The following examples illustrate the invention, the parts and percentages being by weight, unless otherwise stated, and the relationship of parts by weight to parts by volume being the same as that of the kilogram to the liter.

*Example 1*

A suspension of 3.1 parts of 2-(3'-carboxyphenylamino)-4:6-dichloropyrimidine in 100 parts of dry nitrobenzene is treated with 2 parts of thionyl chloride and converted into the corresponding carboxylic chloride by heating for 2 hours at 95° C. 2.3 parts of 5:5'-diamino-1:1'-dianthrimidecarbazole are then stirred into the solution and the whole is heated for 4 hours at 140 to 145° C. and then for 2 hours at 170 to 175° C. After cooling, the dyestuff of the formula

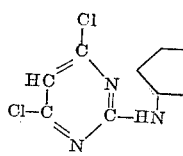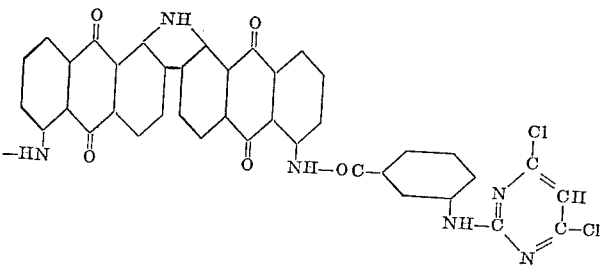

is filtered off, washed with nitrobenzene and then with alcohol, and dried in vacuo at 50 to 60° C.

When dry, the resulting dyestuff forms a brown powder which dyes cotton and regenerated cellulose from a hydrosulfite vat yellowish brown shades of very good fastness properties, more especially good fastness to solvents. The dyestuff is fixed on the fiber so securely that even when the dyeing is treated with a hot organic solvent such as dimethyl-formamide or pyridine its tinctorial strength is not substantially impaired.

When in this example 5:5'-diamino-1:1'-dianthrimide-carbazole is replaced by 2.3 parts of 4:4'-diamino-1:1'-dianthrimidecarbazole, a dyestuff is obtained which gives olive dyeings of equally good properties.

The 2-(3' - carboxyphenylamino)-4:6-dichloropyrimidine used in this example can be prepared in crystalline form, for example, by heating an aqueous-alcoholic solution of 50% strength of molecular proportions of the sodium salt of 3-aminobenzoic acid and 2:4:6-trichloro-pyrimidine for 4 hours at 70 to 75° C.

*Example 2*

3.1 parts of 2-(4'-carboxyphenylamino)-4:6-dichloropyrimidine are suspended with stirring in 90 parts of dry nitrobenzene and converted into the corresponding carboxylic acid chloride with 2 parts of thionyl chloride, with addition of 0.1 part of anhydrous pyridine, by heating for 2 hours at 90 to 95° C. The excess thionyl chloride is then removed from the clear solution in vacuo, and 2.9 parts of the finely powdered intermediate of the formula

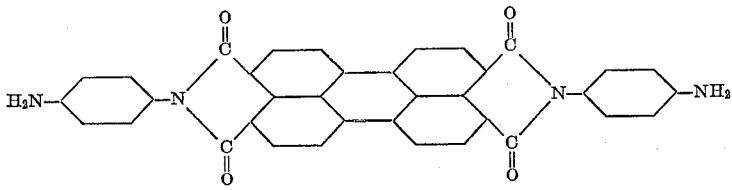

are then added. While stirring the mixture it is heated for 4 hours at 140 to 150° C. and then for another 6 hours at 170 to 180° C. After cooling, the red suspension of the new dyestuff of the formula

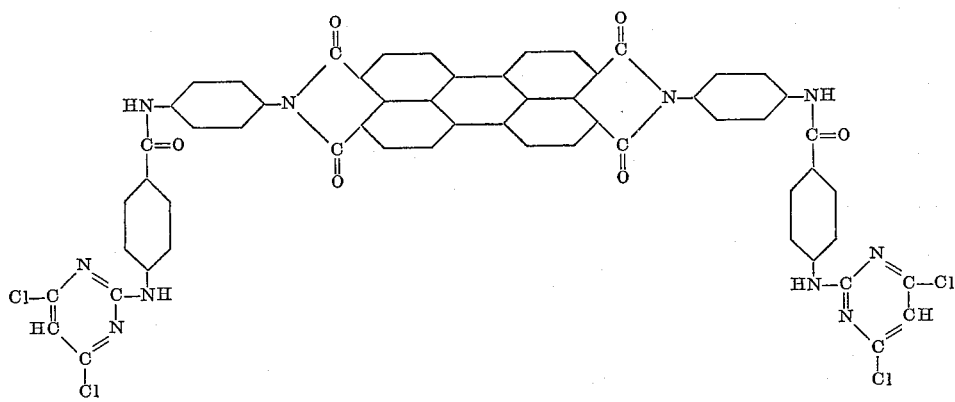

is filtered and the filter residue is washed with nitrobenzene and then with methanol, and dried in vacuo at 50° C.

From an alkaline hydrosulfite vat the dyestuff dyes cotton and regenerated cellulose clear red shades having very good properties of fastness.

The 2-(4' - carboxyphenylamino)-4:6-dichloropyrimidine used in this example can be prepared in crystalline form by heating an aqueous-alcoholic solution of 50% strength of molecular proportions of the sodium salt of 4-aminobenzoic acid and of 2:4:6-trichloropyrimidine for several hours at 70 to 75° C.

*Example 3*

6.3 parts of 2-(3' - carboxyphenylamino)-4:6-dichloropyrimidine in 100 parts of dry nitrobenzene are converted with 4 parts of thionyl chloride into the corresponding carboxylic acid chloride by thoroughly stirring the mixture for 2 hours at 90 to 95° C. 6.9 parts of 1-amino-4-benzoylaminoanthraquinone are then added and the mixture is heated with stirring to 125 to 130° C. After cooling to room temperature, the dyestuff of the formula

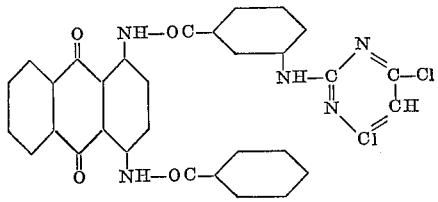

is filtered off, washed with a small amount of nitrobenzene and then with alcohol, and dried in vacuo at 50° C.

The resulting dyestuff forms in the dry state a red powder which dyes cotton and regenerated cellulose from a hydrosulfite vat orange-red shades having very good fastness to light.

When in this example the 6.9 parts of 1-amino-4-benzoyl-aminoanthraquinone are replaced by an equal amount of 1-amino-5-benzoylaminoanthraquinone or by an equimolecular amount of 1-amino-6:7-dichloroanthraquinone, yellow dyestuffs having similar properties are obtained.

*Example 4*

3.0 parts of 2-(3'-carboxyphenylamino)-4:6-dichloro pyrimidine in 80 parts of dry nitrobenzene are converted into the acid chloride with 2.0 parts of thionyl chloride by heating for 2 hours at 90 to 95° C. The excess thionyl chloride is then removed from the solution, whereupon 2.4 parts of 4-amino-1:9-anthrapyrimidine are added. The mixture is condensed for 3 hours at 140 to 145° C. with stirring and then cooled to 20° C. The precipitated dyestuff of the formula is filtered off, washed with a small amount of nitrobenzene and then with alcohol, and dried in vacuo at 45 to 50° C.

The dystuff so obtained dyes cotton and regenerated cellulose from a hydrosulfite vat yellow shades having good fastness properties, above all good fastness to solvents.

*Example 5*

While being stirred, a suspension of 3.1 parts of 2-(4'-carboxyphenylamino) - 4:6-dichloropyrimidine in 100 parts of dry nitrobenzene is treated with 2 parts of thionyl chloride and then with 0.1 part of pyridine and converted into the corresponding carboxylic chloride by heating for 2 hours at 95° C. 2.3 parts of 4:4'-diamino-1:1'-dianthrimide-carzabole are then stirred in, another 0.1 part of pyridine is added, and the whole is heated for 4 hours at 140 to 145° C. and then for 6 hours at 170 to 180° C. After cooling, the dyestuff of the formula

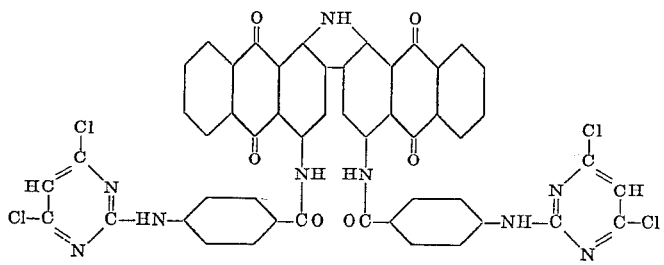

is filtered off, washed with nitrobenzene and then with alcohol, and dried in vacuo at 50 to 60° C.

The resulting dyestuff dyes cotton and regenerated cellulose from an alkaline hydrosulfite vat olive shades having very good properties of fastness.

*Example 6*

6.2 parts of 2-(4'-carboxyphenylamino)-4:6-dichloropyrimidine in 100 parts of dry nitrobenzene are converted into the carboxylic acid chloride with 4 parts of thionyl chloride by stirring and heating at 90 to 100° C. 0.1 part of pyridine and then 6.8 parts of 4-aminoanthraquinone-2:1(N)-acridone are added and the mixture is condensed for 2 hours at 120 to 125° C. and then for another hour at 145 to 150° C. After cooling, the dyestuff of the formula

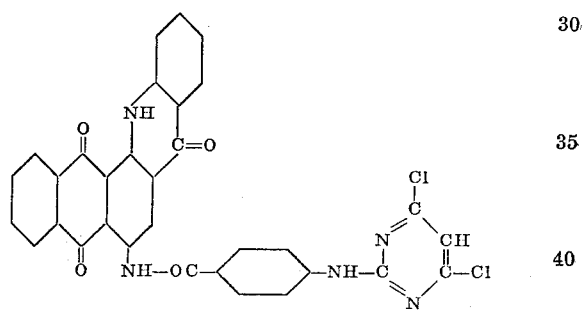

is filtered off, washed with nitrobenzene and then with alcohol, and dried in vacuo at 50° C.

The resulting dyestuff dyes cotton and regenerated cellulose from a hydrosulfite vat greenish blue shades having good properties of fastness.

*Example 7*

As described in Example 5, 3.1 parts of 2-(4'-carboxyphenylamino)-4:6-dichloropyrimidine in 100 parts of nitrobenzene are converted into the carboxylic acid chloride with 2 parts of thionyl chloride and 0.1 part of pyridine. 4.2 parts of aminoacedianthrone are then stirred in and the mixture is condensed for 3 hours at 140 to 150° C. After cooling, the brown dyestuff suspension is filtered, and the dyestuff is washed with nitrobenzene and then with alcohol, and dried in vacuo at 60° C.

The dyestuff of the formula

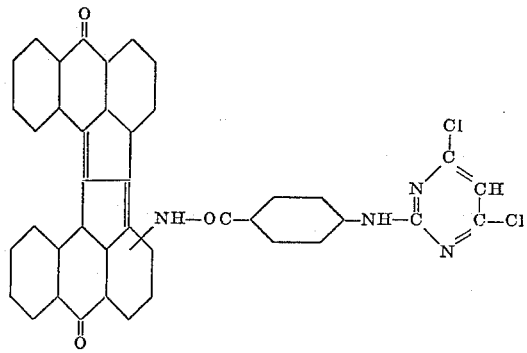

dyes cotton and regenerated cellulose vivid brown shades having very good properties of fastness.

*Example 8*

5.3 parts of aminoacedianthronesulfonic acid in the form of its sodium salt are dissolved in 400 parts of water and treated at 50° C. with a solution of 2.2 parts of 2:4:5:6-tetrachloropyrimidine in 100 parts of dioxane. The mineral acid eliminated in the course of the condensation is continuously neutralized at pH=5 to 6 with a total of 10 parts of N-sodium hydroxide solution. On completion of the reaction the dyestuff is salted out with sodium chloride, allowed to cool, filtered off, and dried in vacuo at 60 to 70° C.

The dyestuff of the formula

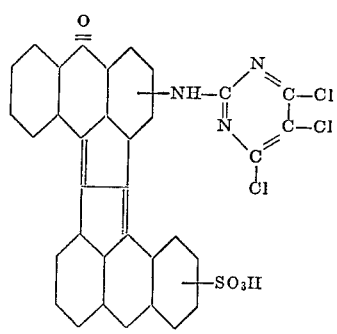

dyes cotton and regenerated cellulose from an alkaline hydrosulfite vat brown shades which are fast to light and washing.

The aminoacedianthronesulfonic acid used in this example can be prepared as follows: Aminoacedianthrone is dissolved in 5 to 10 times its own weight of sulfuric acid of 95% strength, and the solution is heated within one hour to 190° C. It is stirred for another 5 hours at 190° C., allowed to cool, poured over ice, and the aminoacedianthrone-sulfonic acid so formed is filtered off, washed with sodium chloride solution until it is neutral and dried.

*Dyeing method.*—0.15 part of the dyestuff prepared as described in this example are dissolved in 50 parts of water at 60° C. The solution is poured into a solution, heated at 60° C., of 2 parts by volume of sodium hydroxide solution of 36° Bé. and 1.2 parts of hydrosulfite in 350 parts of water. In the resulting dyebath 10 parts of cotton are dyed for 45 minutes with addition of 12 parts of sodium chloride while allowing the temperature of the dyebath to rise to 80° C. The dyed cotton is rinsed in flowing cold water to complete its oxidation, then acidified and soaped at the boil.

*Examples 9 to 18*

By acylating the starting products listed in Column II of the following table with the carboxylic acid chloride of the carboxylic acid shown in Column III, further dyestuffs are obtained which dye cotton the shades shown in Column IV.

| I | II | III | IV |
|---|---|---|---|
| 9 | 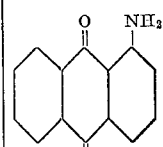 | 2-(4'-carboxy-phenylamino)-4:5:6-trichloro-pyrimidine. | yellow. |
| 10 | 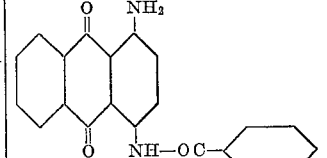 | 2-(4'-carboxy-phenylamino)-4:6-dichloro-pyrimidine. | red. |
| 11 | 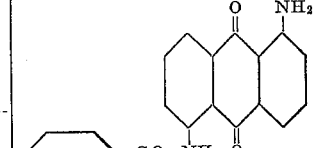 | ___do___ | Do. |
| 12 | 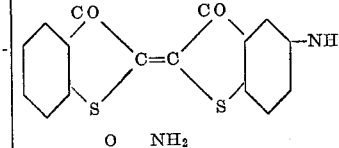 | ___do___ | blue-violet. |
| 13 | 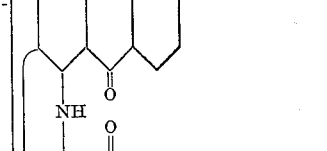 | 2-(4'-carboxyphen-ylamino)-4:5:6-trichloropyrim-idine. | yellowish brown. |
| 14 | 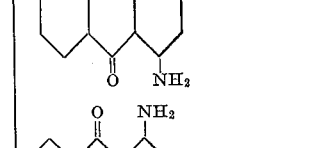 | ___do___ | red. |
| 15 | 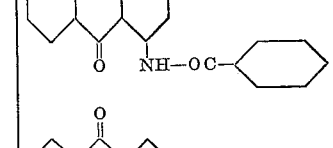 | ___do___ | brown. |
| 16 | 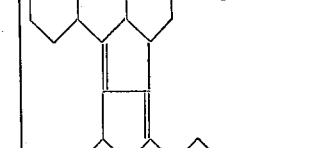 | 2-(3'-carboxyphen-ylamino)-4:6-dichloropyrim-idine. | violet. |

| I | II | III | IV |
|---|---|---|---|
| 17 | 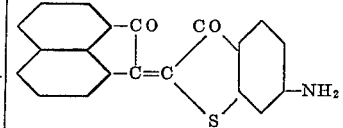 | 2-(3'-cardoxyphen-ylamino)-4:6-dichloropyrimidine. | orange-red. |
| 18 | 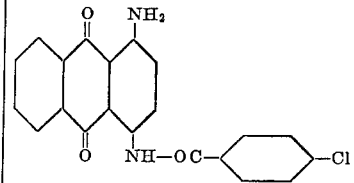 | ----do----------- | Do. |

Example 19

3.45 parts of 1-amino-5-benzoylaminoanthraquinone are dissolved in 75 parts of nitrobenzene by being heated to 120 to 125° C. and mixed with a solution of 3 parts of 2:4:5:6-tetrachloropyrimidine in 25 parts of nitrobenzene. 0.2 parts of dimethylformamide and 0.2 part of absolute pyridine are added and the mixture is heated within one hour to 140 to 145° and stirred on for 6 hours at the same temperature. After cooling, the dyestuff which has crystallized in the form of needles and corresponds to the formula

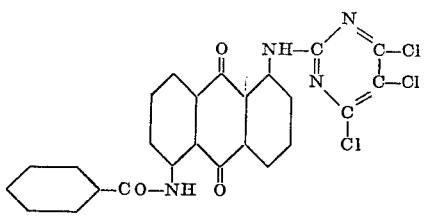

is filtered off, washed with a small amount of nitrobenzene and then with alcohol, and dried in vacuo at 70° C.

The resulting dyestuff dyes cotton and regenerated cellulose orange-yellow shades having good properties of fastness.

When tetrabromopyrimidine is used instead of tetrachloropyrimidine a dyestuff having similar properties is obtained.

Example 20

7.6 parts of 2 - (3' - carboxyphenylamino)-4:5:6-trichloropyrimidine in 100 parts of dry nitrobenzene are converted into the corresponding carboxylic acid chloride with 4 parts of thionyl chloride by heating for 2 hours at 90 to 95° C. with thorough stirring. 6.9 parts of 1-amino-5-benzoylamino-anthraquinone are added and the whole is heated to 125 to 130° C. and stirred on for 3 hours at the same temperature. After cooling to room temperature, the yellow dyestuff of the formula

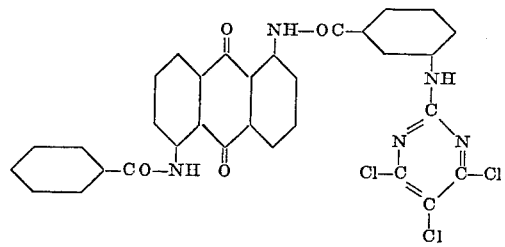

is filtered off, washed with a small amount of nitrobenzene and then with methanol, and dried in vacuo at 60° C.

The 2-(3'-carboxyphenylamino)-4:5:6-trichloropyrimidine used in this example can be prepared, for example, by heating an aqueous-alcoholic solution of 50% strength of molecular proportions of the sodium salt of 3-aminobenzoic acid and of 2:4:5:6-tetrachloropyrimidine for 4 hours at 70 to 75° C.; the product is obtained in the form of colorless needles melting at 203 to 205° C.

14 parts of the dyestuff prepared as described in paragraph 1 above are finely ground in a ball mill with 126 parts of a neutral solution of 125 parts of dinaphthylmethane-disulfonic acid in 1000 parts of water.

A suspension of 7.5 parts of the resulting paste in 250 parts of warm water is added to a solution, heated at 50° C., of 10 parts by volume of sodium hydroxide solution of 30% strength and 6 parts of sodium dithionite in 1750 parts of water and the whole is vatted for one minute. 50 parts of cotton are dyed in the resulting dyebath for 45 minutes at 50 to 60° C. with addition of 60 parts of sodium chloride. The dyed cotton is rinsed, oxidised, acidified, once more thoroughly rinsed, and soaped at the boil. A clear yellow coloration is obtained, when coating polyvinyl chloride, which possesses very good fastness to solvents and migration.

Example 21

3.8 parts of 2 - (4' - carboxyphenylamino)-4:5:6-trichloropyrimidine in 80 parts of dry nitrobenzene are converted into the corresponding carboxylic acid chloride with 2 parts of thionyl chloride by heating for 2 hours at 95 to 100° C. with stirring. 3.45 parts of 1-amino-5-benzoylaminoanthraquinone are added and the mixture is heated to 125 to 130° C. and stirred at the same temperature for 3 hours longer. After cooling to room temperature, the dyestuff of the formula

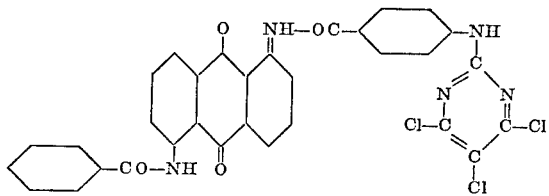

is filtered off, washed with nitrobenzene and then with alcohol, and dried in vacuo at 60° C.

The resulting dyestuff dyes cotton and regenerated cellulose pure yellow shades of very good fastness properties, and when used for coating polyvinyl chloride it produces colorations of good fastness to solvents and migration.

The 2-(4'-carboxyphenylamino)-4:5:6-trichloropyrimidine used in this example can be prepared, for example, by heating an aqueous-alcoholic solution of 50% strength of molecular amounts of the sodium salt of 4-aminobenzoic acid and of 2:4:5:6-tetrachloropyrimidine for 4 hours at 70 to 75° C.; the product is obtained in colorless needles melting at 250 to 252° C.

What is claimed is:

1. A vat dyestuff of the formula

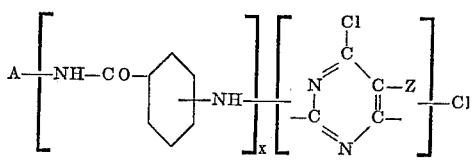

wherein Z is a member selected from the group consisting of H and Cl, and A is a member selected from the group consisting of
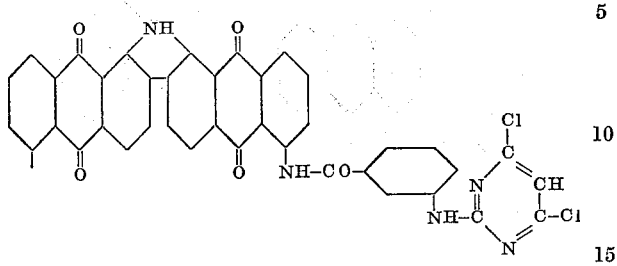
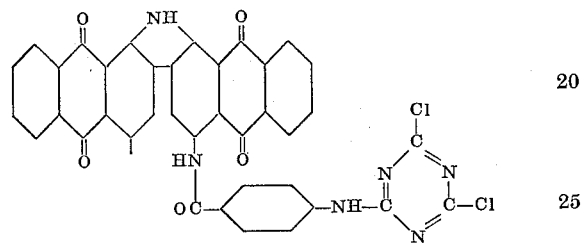
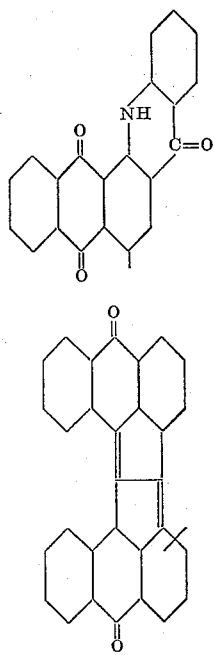
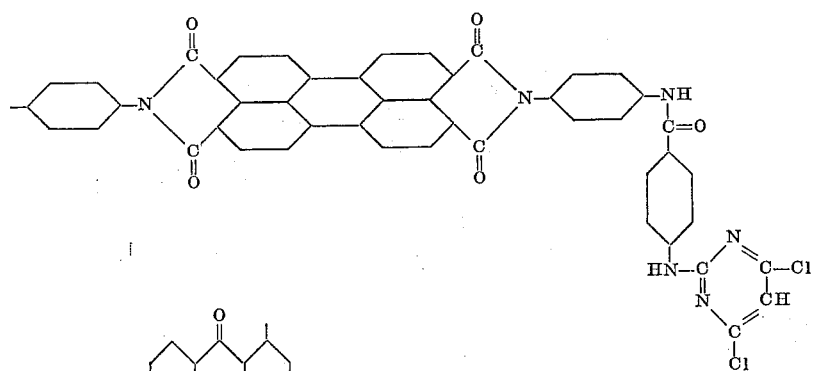
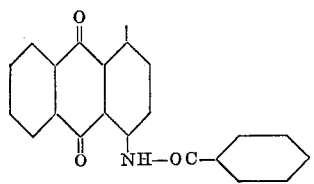
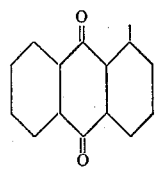
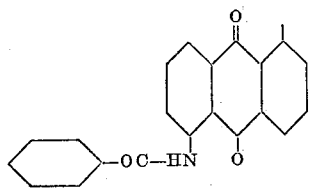
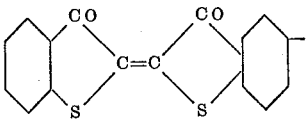
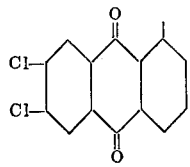
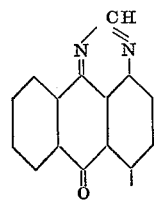
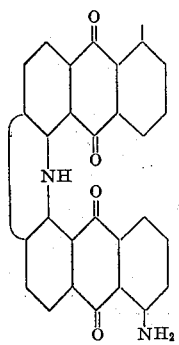

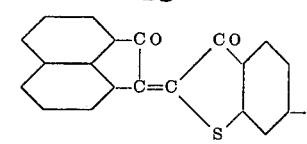
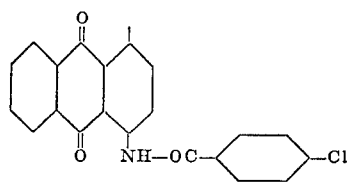
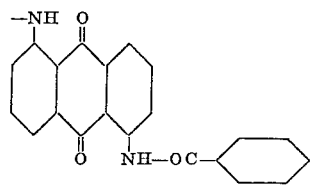
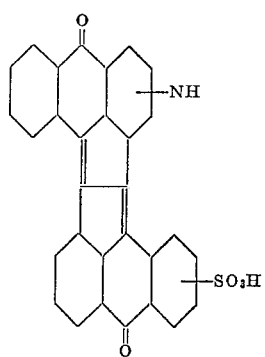
$x$ being a whole number from zero to one and being zero when A is one of the last two mentioned members.
2. The dyestuff of the formula
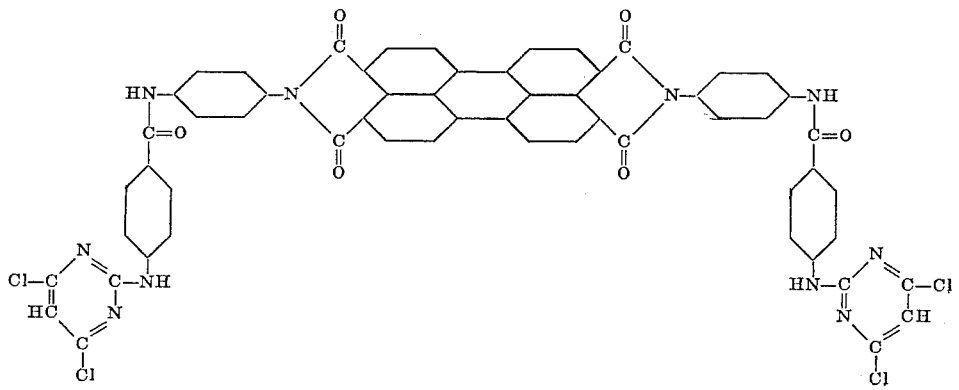
3. The dyestuff of the formula
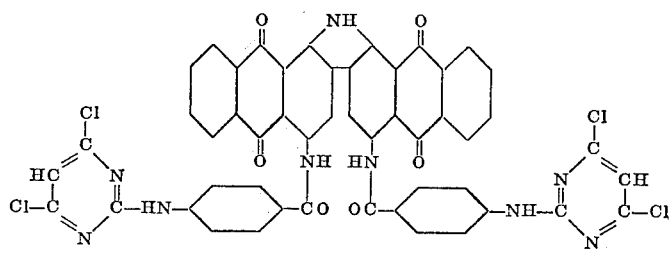
4. The dyestuff of the formula
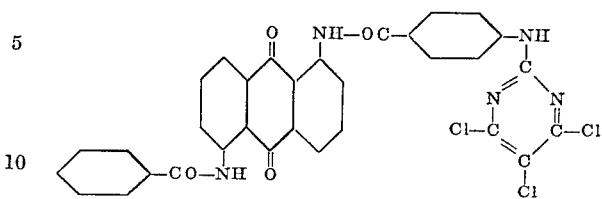
5. The dyestuff of the formula
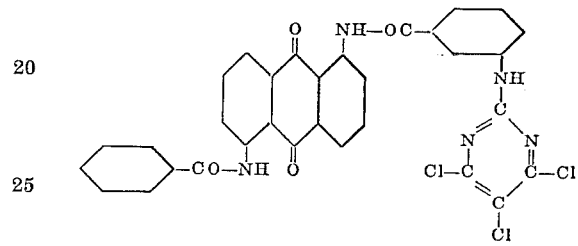
6. The dyestuff of the formula
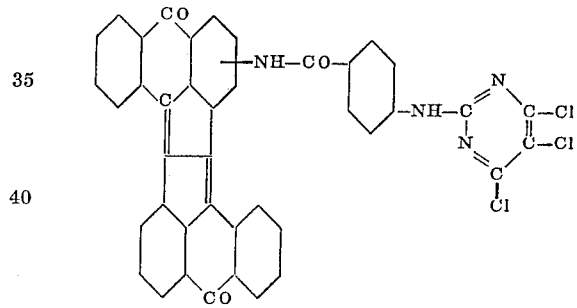

7. The dyestuff of the formula
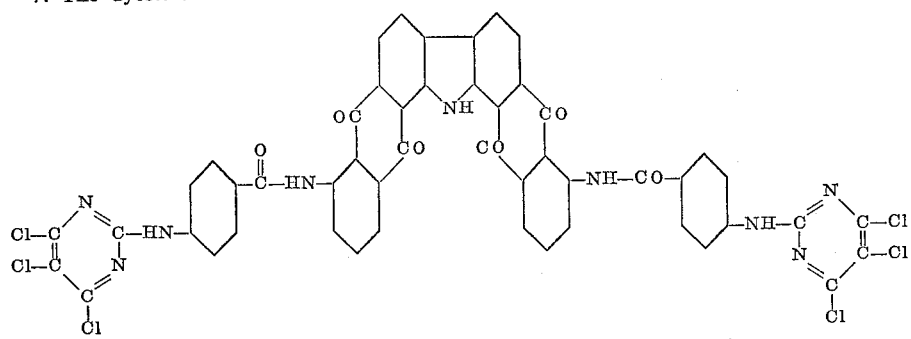
References Cited in the file of this patent
UNITED STATES PATENTS
| | | |
|---|---|---|
| 1,888,631 | Kunz et al. | Nov. 22, 1932 |
| 2,731,464 | Ebel et al. | Jan. 17, 1956 |
| 3,042,475 | Heslop et al. | July 3, 1962 |
FOREIGN PATENTS
| | | |
|---|---|---|
| 91,206 | Norway | Mar. 17, 1958 |

UNITED STATES PATENT OFFICE
CERTIFICATE OF CORRECTION

Patent No. 3,126,382　　　　　　　　　　　　　　March 24, 1964

Max Staeuble

It is hereby certified that error appears in the above numbered patent requiring correction and that the said Letters Patent should read as corrected below.

Column 5, lines 61 to 69, for the right-hand portion of the formula reading:

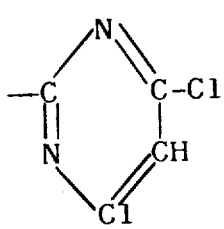　　　read　　　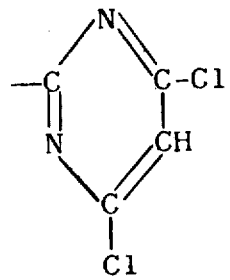

column 6, line 62, for "dystuff" read -- dyestuff --; column 8, lines 30 to 43, the formula should appear as shown below instead of as in the patent:

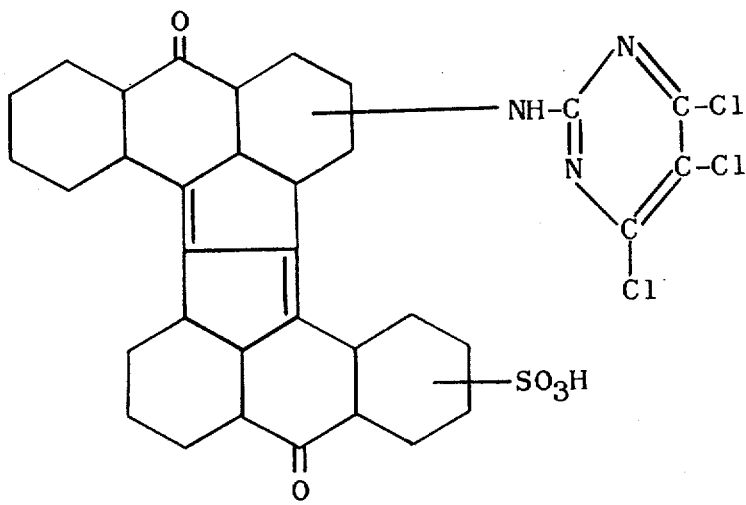

3,126,382 column 11, in the table, under the heading "III", line 1
thereof, for "2-(3'-cardoxyphen-" read -- 2-(3'-carboxyphen-
--; column 12, lines 45 to 53, Example 21, for the upper
left-hand portion of the formula reading:

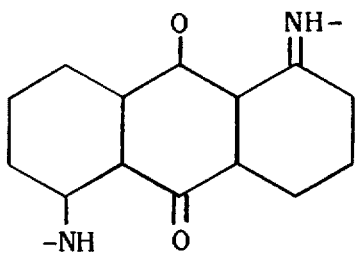   read   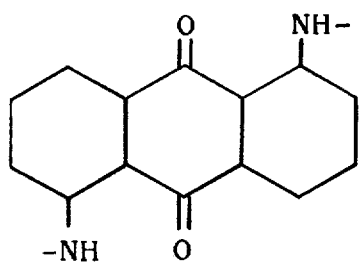

column 13, lines 51 to 58, the fifth formula, for the
right-hand portion of the formula reading:

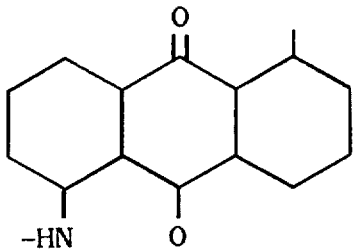   read   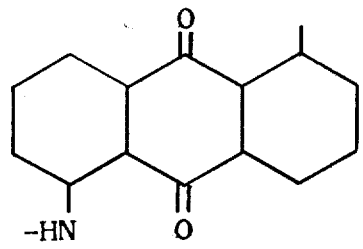

Signed and sealed this 22nd day of December 1964.

(SEAL)
Attest:

ERNEST W. SWIDER
Attesting Officer

EDWARD J. BRENNER
Commissioner of Patents